United States Patent
Drews-Nicolai et al.

(10) Patent No.: US 7,135,065 B2
(45) Date of Patent: Nov. 14, 2006

(54) METHOD FOR THE POST-TREATMENT OF TITANIUM DIOXIDE PIGMENTS

(75) Inventors: Lydia Drews-Nicolai, Köln (DE); Siegfried Bluemel, Ratigen (DE)

(73) Assignee: Kronos International (DE)

( * ) Notice: Subject to any disclaimer, the term of this patent is extended or adjusted under 35 U.S.C. 154(b) by 0 days.

(21) Appl. No.: 11/179,985

(22) Filed: Jul. 12, 2005

(65) Prior Publication Data

US 2006/0034739 A1  Feb. 16, 2006

(30) Foreign Application Priority Data

Jul. 31, 2004  (DE) .................. 10 2004 037 272

(51) Int. Cl.
*C09C 1/36* (2006.01)
*C01G 23/047* (2006.01)
*C01G 23/08* (2006.01)

(52) U.S. Cl. ............... 106/436; 106/438; 106/441; 106/442; 106/446; 423/610; 427/214; 427/215; 427/218; 427/219

(58) Field of Classification Search ........ 106/436, 106/438, 441, 442, 446; 423/610; 427/214, 427/215, 218, 219
See application file for complete search history.

(56) References Cited

U.S. PATENT DOCUMENTS 3,316,204 A * 4/1967 Lederer .................. 523/216
4,052,222 A * 10/1977 Howard ................... 106/438
4,052,224 A * 10/1977 Howard ................... 106/438
4,328,040 A * 5/1982 Panek et al. ............. 106/438
4,405,376 A * 9/1983 Matsunaga et al. ...... 106/438
4,447,270 A * 5/1984 Howard et al. .......... 106/438
4,447,271 A * 5/1984 Howard et al. .......... 106/438
4,450,012 A   5/1984 Messer
5,203,916 A * 4/1993 Green et al. ............. 106/438
5,755,870 A * 5/1998 Ravishankar ............ 106/438

FOREIGN PATENT DOCUMENTS

EP      1541638          6/2005
GB      1365999          9/1974
JP      58-134158 A  *  8/1983

OTHER PUBLICATIONS

Database WPI, section Ch, Week 199602, JP 07 292277 A (Sakai Kagaku Kogyo KK) Nov. 7, 1995.

* cited by examiner

*Primary Examiner*—Anthony J. Green
(74) *Attorney, Agent, or Firm*—Rodney T Hodgson

(57) ABSTRACT

The invention relates to a method for the post-treatment of titanium dioxide, in order to produce particularly weather-resistant titanium dioxide pigments with good optical properties. The method is characterized in that, together with the hydrous oxides of tin and zirconium, at least one other from the group comprising aluminium, silicon and titanium is additionally precipitated onto the particle surface. The post-treatment components are added to the aqueous $TiO_2$ suspension either in the acidic range (pH value of 3 at most) or in the alkaline range (pH value of 10 at least). The pH value is subsequently set to between 6 and 8. Final tempering of the pigment at elevated temperatures from over 125° C. to up to 500° C. can improve the tone b. The pigment is particularly suitable for use in paints, coatings and plastics.

26 Claims, No Drawings

METHOD FOR THE POST-TREATMENT OF TITANIUM DIOXIDE PIGMENTS

CROSS REFERENCE TO RELATED APPLICATIONS

This application claims priority pursuant to Title 35, United States Code, Section 119(a)–(d) or (f), or 365(b) to German Patent Application DE 10 2004 037 272.1 filed 31 Jul., 2004.

FIELD OF THE INVENTION

The field of the invention is the field of treatment of $TiO_2$ pigments.

RELATED US PATENTS AND US PATENT APPLICATIONS

This application is related to U.S. application Ser. No.: 11/158,761 Filed Jun. 21, 2005 by the present inventors.

SUMMARY OF THE INVENTION

Disclosed is a method of post treatment of $TiO_2$ pigments in either very basic or very acid solutions to form a mixed surface layer of tin, zirconium, and at least one of the group consisting of aluminum, silicon, and titanium.

DETAILED DESCRIPTION OF THE INVENTION

The invention relates to a method for the post-treatment of titanium dioxide pigments, to titanium dioxide pigments manufactured in this way, and to their use in paints, coatings and plastics.

It is known that undesirable photocatalytic reactions, induced by UV absorption, lead to degradation of the pigmented material when using $TiO_2$ as a white pigment in paints and coatings, plastics, etc.

In this context, $TiO_2$ pigments absorb light in the near ultraviolet range, resulting in the development of electron-hole pairs that produce highly reactive radicals on the $TiO_2$ surface. In organic media, the radicals formed lead to binder degradation. It is known that the photoactivity of $TiO_2$ can be reduced by subjecting the $TiO_2$ particles to inorganic post-treatment, e.g. with oxides of Si and/or Al and/or Zr. It is further known that the photoactivity, and also other pigment properties, can be improved by the use of Sn compounds, for example.

Several examples of Sn as a component of the post-treatment of $TiO_2$ pigments are given in patents JP 61 141 616 and JP 61 286 221, which describe the production of conductive layers on $TiO_2$, which are manufactured by means of a combination of a tin coating and an antimony coating.

Patents DE 29 51 805 C2 and U.S. Pat. No. 3,316,204 describe the production of laminating paper pigments, where patent DE 29 51 805 C2 describes a laminating paper pigment with a coating of Ce phosphate and Al phosphate, as well as an outer layer made of a fluoride compound, which can, among other things, be a Sn fluoride. U.S. Pat. No. 3,316,204 describes a coating of Sn oxide and Al oxide, where the pigments produced are subsequently calcined at temperatures in excess of 625° C. in order to obtain particularly great resistance to UV radiation when used in the laminating sector.

Further, patents JP 58 134 158 and U.S. Pat. No. 4,405,376 describe pigments with improved dispersibility, good gloss and good stability, which are particularly suitable for the paints and coatings sector. Among them, patent JP 58 134 158 describes a coating made of Sn phosphate and hydrous aluminium oxide.

At this point and below, the oxide precipitated onto the particle surface is always taken as also meaning the respective hydrous oxide.

U.S. Pat. No. 4,405,376 (DE 31 45 620 C3) discloses pigments with an inner layer of Sn oxide and Zr oxide, together with an outer layer of Al oxide. Application of the inner layer of Sn oxide and Zr oxide is accomplished either by neutralisation with NaOH at a pH value of 2 following addition of the Zr and Sn compound, or by addition of an acidic Sn compound at a pH value of 10 to 10.5 following addition of the Zr compound. An outer Al oxide layer is subsequently applied to the inner Sn/Zr oxide layer. The pigments manufactured according to the patent described above demonstrate high gloss, good dispersibility and high photostability (chalk resistance). At the same time, however, the pigments display an undesirable yellow discolouration.

The object of the present invention is to provide a method by which titanium dioxide pigments can be manufactured that, compared to the prior art, demonstrate a further improvement in photostability (chalk resistance), while retaining good optical properties.

The object is solved by a method for the post-treatment of titanium dioxide that comprises the following steps:

a) Production of an aqueous suspension of titanium dioxide base material with a pH value of not more than 3, or a pH value of not less than 10, b) Addition of water-soluble compounds of tin and zirconium, as well as water-soluble compounds of at least one further element from the group comprising aluminium, silicon and titanium, whereby the pH value does not exceed 3, or the pH value does not drop below 10, c) Adjustment of the pH value of the suspension to between 6 and 8.

Further advantageous embodiments of the invention are described in the sub-claims.

In contrast to the method according to U.S. Pat. No. 4,405,376 which produces separate layers of Zr/Sn oxide and Al oxide as a result of intermediate neutralisation of the suspension, the method according to the invention is characterised in that a neutral pH value of between 6 and 8 is only set when all components—Sn, Zr and at least one other from the group comprising Al, Si and Ti—have been added to the suspension. Surprisingly, control of the method in accordance with the invention leads to greatly improved weather resistance of the $TiO_2$ pigments. Further layers can subsequently be applied by precipitation, e.g. a final Al oxide layer for improving the hiding power.

The starting titanium dioxide pigment is base material produced by the familiar sulphate or chloride process, and is present either in anatase form or in rutile form. Particularly base material manufactured by the sulphate process should preferably be stabilised in the familiar manner by means of calcining additives, such as potassium, aluminium, phosphorus, lithium and the like. Starting with an aqueous titanium dioxide base material suspension, the method according to the invention can be implemented both with a highly acidic pH value of 3 at most, preferably 2 at most, and with a highly alkaline pH value of at least 10, preferably at least 11 (Step a).

During the subsequent Step (b), aqueous solutions of the post-treatment components Sn, Zr, and at least one other from the group comprising Al, Si and Ti, are added to the suspension. During addition, the pH value of the suspension remains in the range specified in Step (a), i.e. 3 at most, preferably 2 at most, or at least 10, preferably at least 11. A retention time of 15 to 30 minutes can be allowed after each addition.

Subsequently, in Step (c), the suspension is adjusted to a pH value of between 6 and 8 by adding either alkaline or acidic compounds.

This can be followed by the precipitation of further layers, e.g. the precipitation of a final $Al_2O_3$ layer.

For treatments starting in the acidic range of pH values, aqueous Sn and Zr salt solutions are initially added, as well as at least one other component—Al and/or Ti and/or Si compounds—(Step b). It is important in this context that the pH value is 3 at most during the addition of all components. Consequently, acidic Sn or Zr salt solutions are used with preference. It is also possible to use alkaline solutions as an alternative, in which case acid must be added at the same time to ensure that the pH value does not exceed 3. The person skilled in the art is familiar with suitable substances and the quantities required for control. The order of addition is irrelevant for the purposes of the invention.

The pH value is subsequently increased to the neutral range between 6 and 8 (Step c) using a lye, e.g. NaOH, or an alkaline compound, in combination with a lye, where appropriate. In particular, alkaline compounds already used in Step (b) can also be selected (e.g. sodium aluminate or sodium silicate).

Optionally, a stirring time for homogenisation can be introduced between Step (b) (additions in the pH value range up to 3 at most) and Step (c) (increasing the pH value).

The order of addition of the components is likewise variable when precipitating in the alkaline range. The treatment components—aqueous solutions of Sn and Zr, as well as of Al and/or Si and/or Ti—are initially added to the suspension (Step b) at a pH value of at least 10, preferably at least 11. During this time, the pH value is maintained at at least 10, preferably at least 11, e.g. by parallel addition of a lye, such as NaOH. The person skilled in the art is familiar with suitable substances and the quantities required for control. For example, the water-soluble, alkaline Al compound and/or the alkaline Si compound are added to the suspension first, followed by the aqueous solutions of the Sn and Zr components, as well as the Ti component, where appropriate.

The pH value is subsequently lowered into the neutral range between 6 and 8 (Step c) using an acid, e.g. HCl, or an acidic compound, in combination with an acid like HCl, where appropriate. In particular, acidic compounds already used in Step (b) can also be selected (e.g. acidic Sn or Zr compounds, or aluminium sulphate).

The water-soluble compounds indicated below can, for example, be used as post-treatment components in the described embodiments of the method according to the invention, and all other embodiments, although this list is not to be regarded as exhaustive: Acidic tin compounds open to consideration include acid-reacting tin salts of both bivalent and tetravalent tin, e.g. stannous chloride or stannous sulphate. Sodium and potassium stannate, for example, are available as alkaline tin compounds. Suitable acidic zirconium compounds include, for example, zirconium sulphate, zirconium oxychloride or zirconium nitrate. The alkaline zirconium compound can, for example, be selected from the group of zirconium carbonate complexes. Suitable as the alkaline aluminium compound are alkali aluminates, particularly sodium aluminate. Aluminium sulphate and aluminium chloride are open to consideration as acid-reacting aluminium compounds.

Alkali silicates, particularly sodium silicate (water glass), are used with preference as alkaline silicon compounds.

Suitable titanium compounds are titanyl compounds, such as titanyl sulphate or titanyl chloride.

In this context, the quantities of the post-treatment compounds used in Step (b), calculated as their oxides and referred to the $TiO_2$ base material, are as follows:

0.1 to 1.0% by weight $SnO_2$, preferably 0.2 to 0.5% by weight;

0.1 to 1.5% by weight $ZrO_2$, preferably 0.2 to 1.0% by weight;

0.1 to 1.5% by weight $SiO_2$, preferably 0.2 to 1.0% by weight;

0.1 to 1.0% by weight $TiO_2$;

0.1 to 3.0% by weight $Al_2O_3$, preferably 0.2 to 1.5% by weight.

An Al oxide layer can subsequently be applied to the $TiO_2$ particles coated in accordance with the method described above, using known post-treatment methods and in variable quantities, preferably up to 6.0% by weight, calculated as $Al_2O_3$ and referred to the $TiO_2$ base material.

Final treatment of the $TiO_2$ suspension is performed by methods familiar to the person skilled in the art. For example, the suspension is set to a final pH value of roughly 7. Preferably the final pH value is set to at least 7 particularly to at least 7.5. Hereby improved optical properties, particularly an improved tone b, are achieved. Particularly when using the special embodiment of the process which starts in the alkaline region with a pH value of at least 10, the tone b can be optimised by setting the final pH value to at least 7 preferably to at least 7.5. Subsequently the pigment is freed of the water-soluble salts by washing. Drying is usually accomplished at roughly 110 to 160° C. Finally, the pigment is milled.

It is known that relatively high tin contents in the coating can lead to discolouration of the titanium dioxide pigment, particularly to an increase in the tone b. The tone b can be greatly improved, without impairing stability, by tempering the pigments post-treated according to the invention at temperatures from over 125° C. to up to 500° C., preferably at about 160° C. and particularly at about 250° C.

The pigments manufactured according to the invention thus display improved photostability (chalk resistance) compared to the reference pigments and, following tempering, also better optical properties (brightness and tone). They are particularly suitable for pigmenting plastics, paints and coatings.

EXAMPLES

The invention is explained on the basis of a number of examples below, although these are not to be taken as being a restriction. The quantities indicated in % by weight refer in each case to the $TiO_2$ base material. Each addition is followed by a stirring time of roughly 15 to 30 minutes.

Example 1

A sand-milled suspension of $TiO_2$ base material, manufactured by the chloride process, with a $TiO_2$ concentration of 450 g/l is set to a pH value of 2 with HCl at 60° C. While stirring, 0.5% by weight $SnO_2$ are added to the suspension in the form of stannous chloride solution, followed by 0.5% by weight $ZrO_2$ in the form of zirconium oxychloride. While stirring, 0.3% by weight $Al_2O_3$ in the form of sodium aluminate are added, the pH value subsequently being adjusted to roughly 7 by further addition of sodium aluminate.

Using a fixed-pH method, $Al_2O_3$—added in the form of sodium aluminate—is precipitated by addition of HCl at a pH value of 7 to 8, such that the total quantity of $Al_2O_3$ is 3.0% by weight. Finally, the suspension is freed of the water-soluble salts by washing, dried for 16 hours at 125° C. or at 160° C. or at 250° C., and subsequently milled.

The chalk resistance of the pigment is 100%. The tone b is 0.8 after drying at 125° C., 0.4 after drying at 160° C., and 0.3 after drying at 250° C.

Example 2

A sand-milled suspension of $TiO_2$ base material, manufactured by the chloride process, with a $TiO_2$ concentration of 450 g/l is set to a pH value of 2 with HCl at 60° C. While stirring, 0.5% by weight $SnO_2$ are added to the suspension in the form of stannous chloride solution. Subsequently, 0.5% by weight $ZrO_2$ are added to the suspension in the form of zirconium sulphate, followed in the next step by 0.5% by weight $SiO_2$ in the form of sodium water glass. The pH value is roughly 1.4. Subsequently, 2.6% by weight $Al_2O_3$ are added in the form of sodium aluminate, and 0.4% by weight $Al_2O_3$ in the form of aluminium sulphate. Finally, the suspension is set to a pH value of 7, freed of the water-soluble salts by washing, dried and milled.

The chalk resistance of the pigment is 111%.

Example 3

A sand-milled suspension of $TiO_2$ base material, manufactured by the chloride process, with a $TiO_2$ concentration of 450 g/l is set to a pH value of 2 with HCl at 60° C. While stirring, 0.5% by weight $SnO_2$ are added to the suspension in the form of stannous chloride solution. Subsequently, 0.5% by weight $ZrO_2$ are added to the suspension in the form of zirconium sulphate, followed by 0.2% by weight $TiO_2$ in the form of titanyl chloride. In the next step, 0.3% by weight $SiO_2$ are added to the suspension in the form of sodium water glass. This is followed by the addition of 0.3% by weight $Al_2O_3$ in the form of sodium aluminate and subsequent adjustment of the pH value to 8 by further addition of sodium aluminate. Subsequently, $Al_2O_3$—added in the form of sodium aluminate—is precipitated by addition of HCl at a pH value of 7 to 8, using a fixed-pH method, such that the total quantity of $Al_2O_3$ is 3.0% by weight.

The suspension is finally set to a pH value of 7, freed of the water-soluble salts by washing, dried for 16 hours at 125° C., at 160° C. or at 250° C., and milled. The chalk resistance of the pigment is 111%. The tone b is 0.8 after drying at 125° C., 0.5 after drying at 160° C., and 0.3 after drying at 250° C.

Example 4

A sand-milled suspension of $TiO_2$ base material, manufactured by the chloride process, with a $TiO_2$ concentration of 450 g/l is set to a pH value of 11 with NaOH at 60° C. While stirring, 0.5% by weight $ZrO_2$ are added to the suspension in the form of zirconium oxychloride. The pH value of the suspension is stabilised at 11 with NaOH. In the next step, 0.5% by weight $SiO_2$ are added to the suspension in the form of sodium water glass, followed by 0.5% by weight $SnO_2$ in the form of $SnCl_2$. The pH value is subsequently set to between 7 and 8 with HCl. Subsequently, 3.0% by weight $Al_2O_3$—added in the form of sodium aluminate—are precipitated by addition of HCl at a fixed pH value of 7 to 8.

Finally, the suspension is set to a pH value of 7, freed of the water-soluble salts by washing, dried for 16 hours at 125° C., at 160° C. or at 250° C., and subsequently milled. The chalk resistance of the pigment is 90%. The tone b is 0.5 after drying at 125° C., 0.5 after drying at 160° C., and 0.3 after drying at 250° C.

Comparative Example A

A sand-milled suspension of $TiO_2$ base material, manufactured by the chloride process, with a $TiO_2$ concentration of 450 g/l is set to a pH value of 2 with HCl at 60° C. While stirring, 0.5% by weight $SnO_2$ are added to the suspension in the form of stannous chloride solution, followed by 0.5% by weight $ZrO_2$ in the form of zirconium sulphate. In the next step, the suspension is set to a pH value of 8 by adding NaOH.

Subsequently, $Al_2O_3$ is admixed in the form of parallel addition of sodium aluminate and HCl at a fixed pH value of 7 to 8, such that the total quantity of $Al_2O_3$ is 3.0% by weight. Finally, the suspension is freed of the water-soluble salts by washing, dried for 16 hours at 125° C. and at 160° C., and milled.

The chalk resistance of the pigment is 83%. The tone b is 0.8 after drying at 125° C. and 0.5 after Drying at 160° C.

Comparative Example B

Comparative example B corresponds to Example 4 without the addition of $SiO_2$: A sand-milled suspension of $TiO_2$ base material, manufactured by the chloride process, with a $TiO_2$ concentration of 450 g/l is set to a pH value of 11 with NaOH at 60° C. While stirring, 0.5% by weight $ZrO_2$ are added to the suspension in the form of zirconium oxychloride. The pH value of the suspension is stabilised at 11 with NaOH. Subsequently, 0.5% by weight $SnO_2$ are added in the form of $SnCl_2$.

Subsequently, 3.0% by weight $Al_2O_3$—added in the form of sodium aluminate—are precipitated by addition of HCl at a fixed pH value of 7 to 8.

Finally, the suspension is set to a pH value of 7, freed of the water-soluble salts by washing, dried for 16 hours at 125° C. and at 160° C. and subsequently milled.

The chalk resistance of the pigment is 83%. The tone b is 0.5 after drying at 125° C. and 0.5 after drying at 160° C.

Testing

The photostability of the pigments produced in accordance with the examples and the comparative examples is tested in an alkyd paint system exposed to accelerated weathering. Weathering takes place in a Weather-Ometer (WOM), a weathering machine comprising a ventilated test chamber with a.) Radiation source (carbon electrodes that generate an arc in operation)
b.) Radiation filter made of special glass
c.) Device for sprinkling the specimens with water
d.) Atomiser for creating atmospheric humidity
e.) Rotary specimen holder The test cycle simulates outdoor exposure in accelerated fashion. The paint weathers within the test period. The chalk resistance is examined in parallel. In addition, a reference pigment is used as the standard in every test cycle.

Chalking is measured according to DIN 53159. A piece of wet, black photographic paper is pressed onto the chalking paint surface for this purpose. The onset of chalking (chalking resistance) is defined as the day on which pigment and filler particles leave a complete, white imprint. The chalk resistance is indicated in percent, referred to the standard.

The optical properties, particularly the tone b, are determined on the basis of DIN 5033 by measuring the brightness L*, tone a* and tone b* of titanium dioxide pigments in paint and solvent-free powder tablets. The powder tablet is produced under defined conditions from the pigment to be tested. A HUNTERLAB colorimeter is used to determine the reflectance values.

Test Results

It can be seen that, compared to the process known from the prior art (U.S. Pat. No. 4,405,376), where a separate Zr/Sn oxide layer is applied by precipitation, the process according to the invention leads to substantially improved photostability (chalk resistance) of the $TiO_2$ pigment. This applies to treatment in the acidic range (Examples 1, 2 and 3/Comparative example A) and in the alkaline range (Example 4/Comparative example B).

The results for example pigments 1, 3 and 4 additionally demonstrate that the tone b of the $TiO_2$ pigment treated with Sn oxide can be shifted towards lower values by final tempering at elevated temperatures (e.g. 250° C. as opposed to 160° C. and 125° C.)

Obviously, many modifications and variations of the present invention are possible in light of the above teachings. It is therefore to be understood that, within the scope of the appended claims, the invention may be practiced otherwise than as specifically described. All references contained herein are hereby incorporated by reference.

We claim:

1. A method of post treatment of titanium dioxide pigment particles, comprising:
    a) preparing an aqueous suspension of titanium dioxide pigment particles base material with a pH value outside the range of 3 to 10; then
    b) adding to the aqueous suspension of pigment particles base material water-soluble compounds of tin and zirconium, and of at least one further element selected from the group consisting of aluminum, silicon and titanium, wherein the pH value remains outside the range of 3 to 10; then
    c) setting the pH value of the suspension to between 6 and 8.

2. The method of claim 1, wherein
in step b) 0.1 to 1.0% by weight of a tin compound is used, calculated as $SnO_2$ and referred to the base material.

3. The method of claim 2, wherein
the tin compound used is selected from the group consisting of stannous chloride, stannous sulphate, potassium stannate and sodium stannate.

4. The method of claim 1, wherein
in step b) 0.1 to 1.5% by weight of a zirconium compound is used, calculated as $ZrO_2$ and referred to the titanium dioxide pigment particles base material.

5. The method of claim 4, wherein
the zirconium compound used is selected from the group consisting of zirconium sulphate, zirconium oxychloride, zirconium nitrate and zirconium carbonate.

6. The method of claim 1, wherein
in step b) 0.1 to 3.0% by weight of an aluminum compound is used, calculated as $Al_2O_3$ and referred to the titanium dioxide pigment particles base material.

7. The method of claim 6, wherein
the aluminum compound used is selected from the group consisting of alkali aluminates.

8. The method of claim 1, wherein
in step b) 0.1 to 1.5% by weight of a silicon compound is used, calculated as $SiO_2$ and referred to the titanium dioxide pigment particles base material.

9. The method of claim 8, wherein
the silicon compound used is an alkali silicate.

10. The method of claim 1, wherein
in step b) 0.1 to 1.0% by weight of a titanium compound is used, calculated as $TiO_2$ and referred to the titanium dioxide pigment particles base material.

11. The method of claim 10, wherein
the titanium compound used is a titanyl compound.

12. The method of claim 1, further comprising the step
d) after step c), precipitating an outer layer of aluminum oxide on surfaces of the pigment particles.

13. The method of claim 12, further comprising
e) after step d), setting a final pH value of the suspension to at least 7.

14. The method of claim 1, wherein the pigment particles are finally dried at temperatures in the range 125° C. to 500° C.

15. The method of claim 1, wherein
one of the components used in step b) is employed for setting the pH value in step c).

16. The method of claim 2, wherein
in step b) 0.2 to 0.5% by weight of a tin compound is used, calculated as $SnO_2$ and referred to the titanium dioxide pigment particles base material.

17. The method of claim 4, wherein
in step b) 0.2 to 1.0% by weight of a zirconium compound is used, calculated as $ZrO_2$ and referred to the $TiO_2$ titanium dioxide pigment particles base material.

18. The method of claim 6, wherein
in step b) 0.2 to 1.5% by weight of an aluminum compound is used, calculated as $Al_2O_3$ and referred to the titanium dioxide pigment particles base material.

19. The method of claim 8, wherein
in step b) 0.2 to 1.0% by weight of a silicon compound is used, calculated as $SiO_2$ and referred to the titanium dioxide pigment particles base material.

20. The method of claim 9, wherein the silicon compound used is sodium silicate.

21. The method of claim 11, wherein
the titanium compound used is titanyl sulphate or titanyl chloride.

22. The method of claim 13, further comprising setting a final pH value of the suspension to at least 7.5 in step e).

23. The method of claim 14, wherein the pigment particles are finally dried at temperatures in the range 250° C. to 500° C.

24. The method of claim 1, further comprising;
adding the titanium dioxide pigment particles resulting from steps a) through c) to a coating material.

25. The method of claim 1, further comprising;
adding the titanium dioxide pigment particles resulting from steps a) through c) to a plastic material.

26. The method of claim 1, further comprising;
adding the titanium dioxide pigment particles resulting from steps a) through c) to a paint.

* * * * *